United States Patent [19]

Liba et al.

[11] 4,397,333

[45] Aug. 9, 1983

[54] FUEL COLLECTOR ASSEMBLY

[75] Inventors: Joseph Liba, East Detroit; Michael Rafferty, Madison Heights, both of Mich.

[73] Assignee: Chrysler Corporation, Highland Park, Mich.

[21] Appl. No.: 299,373

[22] Filed: Sep. 4, 1981

[51] Int. Cl.³ .............................................. F17B 1/00
[52] U.S. Cl. .................................. 137/574; 137/576; 123/514; 123/516
[58] Field of Search ............... 137/565, 566, 571, 574, 137/576; 220/85 S; 123/514, 516

[56] References Cited

U.S. PATENT DOCUMENTS

| | | | |
|---|---|---|---|
| 2,215,469 | 9/1940 | Janssen | 123/516 |
| 2,550,808 | 5/1951 | Hays et al. | 137/576 |
| 2,767,736 | 10/1956 | Lackinger | 137/574 |
| 3,020,950 | 2/1962 | Schraivogel | 137/574 |
| 3,049,171 | 8/1962 | Neverburg | 137/574 |
| 3,726,310 | 4/1973 | Coscia | 137/576 |
| 4,279,232 | 7/1981 | Schuster et al. | 123/516 |

Primary Examiner—Alan Cohan
Assistant Examiner—John A. Rivell
Attorney, Agent, or Firm—Newtson and Dundas

[57] ABSTRACT

A liquid fuel collecting and damming assembly located in a vehicle fuel tank to aid the intake of fuel to the engine by elevating the level of fuel about the fuel inlet particularly when the liquid level in the tank is relatively low. The assembly provides an open-ended cylindrical wall which is supported on the fuel tank bottom so that the inlet to the fuel line extends through the resultant open top so as to extend downward toward the bottom. A fuel return conduit extends through the collector assembly's wall and has an outlet end portion spaced vertically upward from the inlet portion so that fuel is discharged therethrough into the collector assembly and enters at an elevated level. The fuel supply in the collector assembly remains at the elevated level with respect to fuel in the tank at a low level condition due to the raised outlet portion of the return conduit.

9 Claims, 3 Drawing Figures

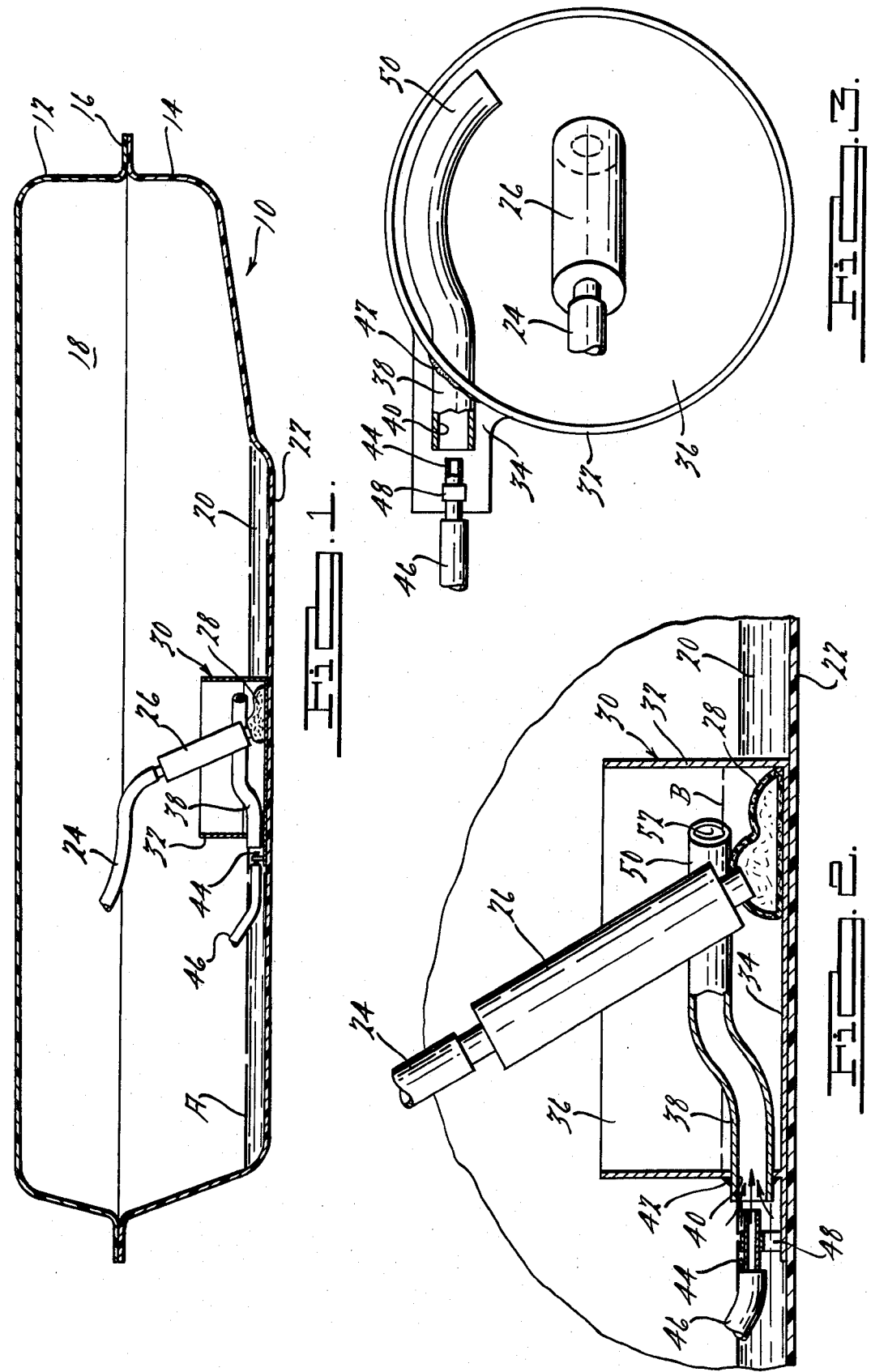

FUEL COLLECTOR ASSEMBLY

FIELD OF THE INVENTION

This invention relates to an improved fuel collecting and damming assembly for vehicle fuel tanks which include unique fuel return means to enhance the fuel level within the collecting assembly with respect to a low fuel level in the remainder of the tank surrounding the collecting assembly.

In vehicle fuel tanks it is desirable to utilize fuel collecting means and there have been prior attempts at providing such devices. Most modern fuel tanks have been designed with a relatively thin vertical dimension and within a corresponding larger horizontal area. This is due particularly to the desire for a low profile of the vehicle which enhances fuel economy by providing a desired aerodynamic shape to the vehicle. However, the resultant fuel tank has a relatively flat shape including a relatively thin vertical dimension. This creates problems in maintaining a sufficient fuel level about the fuel inlet particularly when the fuel level in the tank is permitted to fall to relatively low levels. To compound the problem, an electric fuel pump is often utilized in the tank to pump fuel from the tank to the engine and while these fuel pumps are self-priming, if there is insufficient fuel about the inlet, air can enter the pump which is detrimental to the continuous supply of fuel to the engine.

A prior fuel tank collector assembly is disclosed in U.S. Pat. No. 3,049,171 to Neuerburg et al and assigned to Daimler-Benz. In the Neuerburg patent, a spiral wall is supported by the fuel tank bottom to form an enclosure about an inlet portion of a fuel supply system. A fuel return line is connected to a fuel pump and utilized to pump fuel into the central portion of the collector assembly. While the fuel system is operative, the fuel swirls toward the center of the collector and draws fuel from the tank to produce an artificially high fuel level in that central portion. However, once the engine fuel system is inoperative, fuel is free to flow outward between the spirally overlapped walls into the remainder of the tank. It is also quite possible for fuel to be inducted from the central portion of the collector by accelerating forces which occur when a vehicle is turning. The resultant flow from the fuel collector is undesirable and an object of the subject improved fuel collector assembly is to prohibit return flow of fuel from the central portion.

The subject improved collecting and damming assembly includes a continuous wall means enclosing an interior portion with an open top. The inlet end portion of the vehicle fuel supply system extends through the open top into the interior portion to withdraw fuel. The subject collector is adapted to be utilized with a fuel supply system having a fuel return means to discharge any excess fuel pumped from the fuel tank back into the collector. The excess fuel is returned under pressure in the return line and a nozzle portion is formed thereof which points into an open end of a return tube extending through the wall of the collector. This open end of the return tube also permits entry of fuel from the fuel tank surrounding the collector assembly and adjacent the fuel tank bottom. The inlet tube extends through the collector wall and is then directed upwardly within the collector interior its open outlet end discharges fuel at an enhanced or increased fluid level with respect to the fuel at the open inlet end. Thereafter, when the engine fuel supply system is deactivated, supply of pressurized fluid to the return tube ceases. However, because of the elevation of the outlet end with respect to the inlet end, fuel within the collector does not drop below a level corresponding to the outlet level. This level may be considerably higher than the fuel in the remainder of the fuel tank and will be sufficient to prime the fuel system when it is again activated.

Therefore, at least one advantageous feature and object of the invention is to provide an improved fuel collector characterized by a continuous upstanding wall supported on the bottom wall of the fuel tank through which an open ended return tube extends at a location just adjacent to the bottom wall of the fuel tank. An outlet end of the tube opens to the interior of the collector at an elevated level with respect to the inlet to retard back flow when the fuel system is inactive.

A further advantage and object of this invention is the provision of a collector assembly which utilizes an upstanding continuous wall so that fuel is trapped within an interior formed by the wall and includes a return fuel means through the wall with an inlet end exposed to the remainder of the fuel tank and located downwardly with respect to the outlet end which empties into the collector so as to retard return draining below the outlet end.

Further objects and advantages of the subject invention will be more readily apparent from a reading of the following detailed description of the preferred embodiment which is illustrated in the drawings described below.

IN THE DRAWINGS

FIG. 1 is a sectioned view of the vehicle fuel tank including the subject collector assembly and portions of a typical fuel supply system;

FIG. 2 is an enlarged fragmentary view of the collector assembly and fuel system components and, FIG. 3 is a planar view of the collector and fuel components systems as shown in FIG. 1.

In FIG. 1 of the drawings, a vehicle fuel tank 10 is illustrated. The fuel tank itself is made up of an upper cup-shaped portion 12 and a lower cup-shaped portion 14. Both portions have outwardly extending radial edge flanges 16 which overlay one another and are utilized to fasten the portions together typically by a weld or other appropriate means. The portions 12 and 14 define an interior space 18 into which fuel is introduced through a fill inlet (not shown).

In FIG. 1, a quantity of fuel 20 is illustrated which obviously represents a relatively low level of fuel in the tank. The fuel 20 is located at the very bottom most part of the tank which is defined by a portion 22 of the lower tank portion 14. It should be noted that modern fuel tanks are designed to be used with autos having a low profile. Therefore, the tank has a relatively great width and length as compared to its height. This is desirable in order to permit aerodynamically styled vehicles with good fuel economy. However, this causes the fuel level, labeled A in FIG. 1, to be very shallow while the actual fuel in the tank may represent several gallons. Often as shown in FIG. 1, level A may be insufficient to permit good fuel pick-up by an inlet conduit 24. An electric fuel pump 26 is connected to conduit 24. It should be noted that the lower inlet portion of the pump 26 includes a fuel pervious strainer portion 28 which may be made of molded nylon in a woven screen-like pattern.

In order to enhance the fuel level about the inlet when the fill condition is at the low level shown in FIGS. 1 and 2, a fuel damming and collector assembly 30 is illustrated. The assembly 30 includes an upstanding continuous wall 32 which is joined to a bottom portion 34 to form an upwardly facing and open ended cup-like device. The collector 30 defines an interior space 36 for the purpose of holding fuel. As previously indicated, an object of the present invention is to provide means to enhance or increase the fuel level within interior 36. To this end, a fuel inlet conduit 38 is provided which has an inlet end portion 40 extending through the wall 32 in a sealing relation at a location just adjacent bottom wall 22 of the fuel tank 10. A joint fillet 42 is illustrated which may take the form of a braze or weld joint and this joins the tube 38 to the wall 32 and seals against fuel leakage between the tube and the wall. In order to introduce fuel into interior 36, the inlet end 40 of tube 38 is open to fuel within tank 10. Also, a fuel nozzle 44 is provided in axial alignment with the open inlet 40 to direct a high pressure and velocity flow of fuel into the open end. The nozzle is connected to a return line 46 which is operably associated with the engine fuel supply system. A bracket 48 from bottom wall 38 supports nozzle 44 and points it so that the high velocity flow passes into the open end 40 of tube 38. The resultant flow from nozzle 44 tends to induce additional flow from the tank into the collector. Actually, the fuel passing through line 46 and nozzle 44 is excess fuel already removed from the fuel tank and not needed for the engine fuel system. Obviously this represents only a portion of the fuel removed by the fuel pump 26 through the line 24.

The fuel passing through the tube 38 travels in a generally tangential direction as shown in FIG. 3. In FIG. 3, it can be seen that the fuel discharged from an open end portion 50 of the tube 38 continues in the tangential direction. Referring back to FIG. 2, it can be seen that fuel is discharged through open end 52 of tube 38 and empties into the interior 36 at a minimum level or elevation B as shown in FIG. 2. This level B is significantly above the level A of fuel 20 in fuel tank 10 when a low fuel condition exists which may register as empty on the fuel tank. Actually empty may represent several gallons of fuel in a large fuel tank.

When the fuel supply system including pump 26 is terminated by turning off the engine, it should be noted that the increased level B of fuel within interior 36 does not drain back into the fuel tank below level B. When the engine is restarted, there is a sufficient quantity of fuel in the space 36 to prevent introduction of air into the pump 26.

Although only one embodiment of the invention has been illustrated in the drawings, it should be understood that the inventive concept may be represented by other modifications all of which may fall within the scope of the following claims which solely define the invention.

What is claimed is:

1. In a vehicle fuel tank which is generally characterized by a bottom wall of substantial area and a relatively large ratio of liquid volume per linear fuel depth so that fuel tends to move from a central area of the tank due to accelerating forces of the associated vehicle particularly when the fuel level is relatively low, an improved fuel intake and collecting arrangement comprising:

fuel collector means supported by the bottom of the fuel tank including a continuous wall of substantial height with respect to the depth of fuel at low fuel levels to define a small volume interior chamber for fuel, a fuel inlet supply line for the vehicle engine with an open inlet end extending into the fuel collector means, means for passing fuel from the fuel tank into the chamber of the collector means so as to build up a volume therein with substantial depth including a conduit extending through the wall of the collector in a sealing manner having an open discharge end portion thereof within the interior of the collector and an intake end portion without, the open intake portion being located close to the bottom wall of the fuel tank, the open discharge portion being located upwardly from the bottom wall so that fuel entering the collector therefrom stands at an increased level with respect to the intake end portion and is prevented from falling below a level corresponding to the height of the outlet end due to backflow.

2. In a vehicle fuel tank which is generally characterized by a bottom wall of substantial area and a relatively large ratio of liquid volume per linear fuel depth so that the fuel tends to move from a central area of the tank due to accelerating forces of the vehicle particularly when the fuel level is relatively low, an improved fuel intake and collecting arrangement comprising:

fuel collector means supported by the bottom of the fuel tank including a continuous wall of substantial height with respect to the depth of fuel at low fuel levels, the collector means defining a relatively small volume interior chamber within the fuel tank but with a substantial depth potential as compared to low fuel levels in the surrounding portions of the fuel tank.

a fuel inlet supply line for the vehicle engine with an open inlet end extending into the collector chamber, fuel return means for directing a portion of the fuel withdrawn from the collector through the supply line back into the collector and including conduit means extending through the collector wall in a sealing manner and with an outlet end portion within the collector interior and an inlet end portion without the interior, the conduit inlet being located close to the bottom wall of the fuel tank and the conduit outlet being located upwardly from the bottom wall so that the level of fuel within the collector may be maintained at a level substantially above the fuel in the remainder of the fuel tank when the tank is at a low fuel condition.

3. The improved fuel intake assembly of claim 2 in which the inlet end of the conduit is open to fuel in the remainder of the fuel tank which surrounds the collector, the return line means including a nozzle portion to direct a high velocity flow of fuel with respect to the open inlet end of the conduit which thereby tends to draw additional fuel from the remainder of the fuel tank into the conduit.

4. The improved fuel intake assembly of claim 2 in which the conduit extends both upward and along the inner collector wall from the intake end portion to the discharge end portion.

5. The improved fuel intake assembly of claim 4 in which the discharge end opening of the conduit is spaced vertically with respect to the inlet of the fuel supply line in the collector.

6. The improved fuel intake assembly of claim 2 in which the open intake end portion of the conduit is axially aligned with an outlet of the return line from the fuel supply system, the outlet further being characterized by a nozzle portion to produce a relatively high speed flow of fuel therefrom which is directed into the open intake end of the conduit.

7. The improved fuel intake assembly of claim 6 in which the open intake end portion is dimensioned so that a sufficient area of flow surrounds the high velocity stream directed therein to produce an increased fuel level within the collector interior with respect to a relatively low level in the remainder of the fuel tank surrounding the collector.

8. An improved collector assembly in a fuel tank including a continuous and upstanding wall supported on a bottom tank wall to define a small volume interior chamber;

a fuel supply system for an engine including a fuel inlet portion directed through an open top surface of the collector and with an open inlet spaced slightly above the collector bottom;

conduit means extending from an open intake end portion outside the collector, through the collector wall in a sealing manner and terminating at an open discharge end portion within the collector for the return flow of fuel into the collector;

the open intake end portion of the return conduit means spaced slightly above the fuel tank bottom and the open discharge end portion being vertically spaced above the intake end so that an increased fuel level in the collector interior with respect to fuel in the remainder of the fuel tank which surrounds the collector will not fall below the elevation of the discharge end portion by flow through the return conduit means;

the fuel supply system including a fuel return portion for fuel unnecessary for engine operation, the fuel return portion including means for producing and directing a relatively high velocity flow of fuel into the open intake end of the return conduit thereby tending to induce a substantial flow of fuel from the remainder of the fuel tank surrounding the collector and into the return conduit and hence into the collector interior.

9. The improved collector assembly of claim 8 in which the discharge end portion of the return conduit is spaced vertically with respect to the fuel supply inlet.

* * * * *